M. BRENNER.
Sheet-Metal Can.
No. 202,514. Patented April 16, 1878.
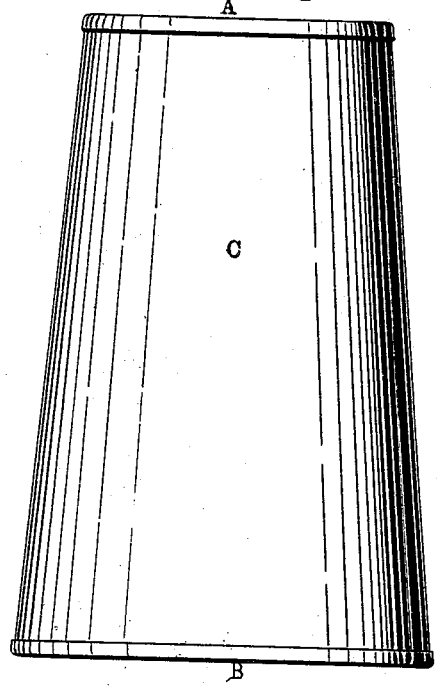
FIG. I.
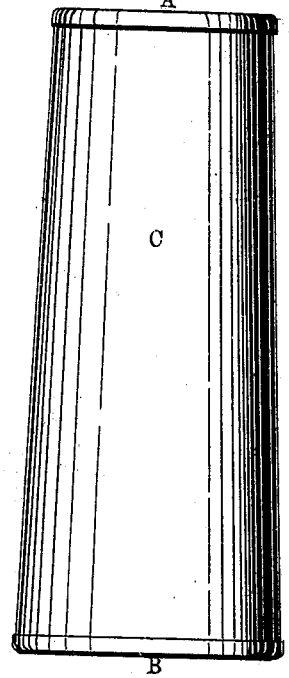
FIG. II.
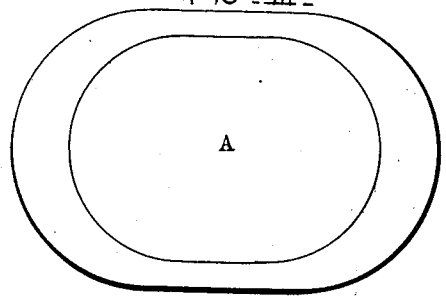
FIG. III.
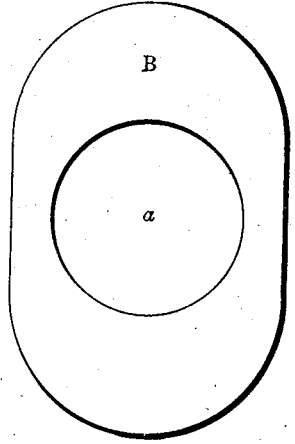
FIG. IV.
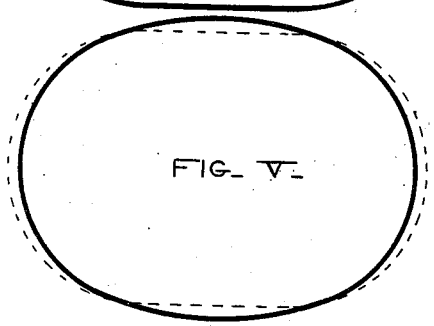
FIG. V.
WITNESSES
INVENTOR

UNITED STATES PATENT OFFICE.

MOSES BRENNER, OF BALTIMORE, MARYLAND.

IMPROVEMENT IN SHEET-METAL CANS.

Specification forming part of Letters Patent No. 202,514, dated April 16, 1878; application filed February 15, 1878.

*To all whom it may concern:*

Be it known that I, MOSES BRENNER, of the city of Baltimore and State of Maryland, have invented certain Improvements in Sheet-Metal Cans in which to pack and preserve cooked and uncooked meats, of which the following is a specification; and I do hereby declare that in the same is contained a full, clear, and exact description of my said invention, reference being had to the accompanying drawings, and to the letters of reference marked thereon.

This invention relates to certain improvements in the can for which Letters Patent No. 187,591 were granted to me on the 20th day of February, 1877, as will hereinafter fully appear.

In the practical use of the can manufactured under my said Letters Patent, I have found that its rounded top is too expensive to warrant its further employment; and also that the cross-sectional shape of the can is not such, at all points in its length, as to permit the free discharge of the meat after the removal of the can-bottom.

In the present invention I therefore use a flat top, and shape the can as follows: The bottom is flanged, and made with parallel sides and rounded ends. The top, which is smaller than the bottom, is similarly flanged and shaped, and the sides of the can, constituting its body, are straight longitudinally of the can, inclining inward as they rise, a cross-section of the body at all points in its length, being rounded at the ends and having parallel sides.

In the drawing forming a part hereof, Figures 1 and 2 are, respectively, a side and an edge view of the improved can, and Figs. 3 and 4, respectively, a top and a bottom view of the same. Fig. 5 is a view of the larger end of the can after the removal of the bottom, showing the distortion of the same by compressing the ends of the can for the purpose of assisting the discharge of the contents.

Similar letters of reference indicate similar parts in all the figures.

In the said drawing, A represents the top, and B the bottom, of the can, and C the body of the same. The bottom B of the can is provided with the usual aperture $a$, and the body C is seamed in the ordinary manner.

To remove the meat from the can, the bottom B is taken off, either by cutting the body near the bottom or destroying the soldered joint and forcing the ends of the body together until the open end of the can assumes the shape represented in Fig. 5 of the drawing. In this operation the body leaves the meat at the sides thereof, and allows the same to be easily discharged by shaking the can.

Having thus described my invention, what I claim as new, and wish to secure by Letters Patent, is—

A sheet-metal can for preserving meats, having a flat flanged bottom with parallel sides and rounded ends, a flat flanged top of similar shape, but reduced in length and width, and a body connecting said bottom and top, having straight surfaces longitudinally of the can, substantially as herein shown and described.

In testimony whereof I have hereunto set my hand this 22d day of January, A. D. 1878.

MOSES BRENNER.

Witnesses:
 THOMAS MURDOCH,
 W. W. WHARTON.